(12) United States Patent  
Tanaka

(10) Patent No.: US 8,771,455 B2  
(45) Date of Patent: Jul. 8, 2014

(54) PROCESS FOR PRODUCTION OF COMPOSITE FINE PARTICLES WITH HETEROGENEOUS SURFACES

(75) Inventor: Masato Tanaka, Niigata (JP)

(73) Assignees: Niigata University, Niigata (JP); Sekisui Chemical Co., Ltd, Osaka (JP)

( * ) Notice: Subject to any disclaimer, the term of this patent is extended or adjusted under 35 U.S.C. 154(b) by 34 days.

(21) Appl. No.: 13/575,649

(22) PCT Filed: Dec. 13, 2010

(86) PCT No.: PCT/JP2010/072364  
§ 371 (c)(1),  
(2), (4) Date: Sep. 27, 2012

(87) PCT Pub. No.: WO2011/092955  
PCT Pub. Date: Aug. 4, 2011

(65) Prior Publication Data  
US 2013/0009331 A1 Jan. 10, 2013

(30) Foreign Application Priority Data  
Jan. 27, 2010 (JP) .................. 2010-016029

(51) Int. Cl.  
*B32B 37/16* (2006.01)

(52) U.S. Cl.  
USPC .......... 156/242; 156/250; 156/307.1; 264/15; 264/140

(58) Field of Classification Search  
USPC ............. 264/15, 140, 157, 144; 156/307.1, 156/309.6  
See application file for complete search history.

(56) References Cited

U.S. PATENT DOCUMENTS

| | | | | |
|---|---|---|---|---|
| 4,948,692 A | * | 8/1990 | Higashimura et al. | 430/108.1 |
| 5,385,801 A | * | 1/1995 | Terasaka et al. | 430/122.4 |
| 5,627,218 A | * | 5/1997 | Bradt | 521/57 |
| 6,620,360 B1 | * | 9/2003 | Simons | 264/132 |
| 6,669,986 B1 | * | 12/2003 | Mushiake et al. | 427/214 |
| 7,541,091 B2 | * | 6/2009 | Sisson et al. | 428/403 |
| 2002/0166637 A1 | * | 11/2002 | Kobayashi et al. | 156/555 |
| 2005/0019555 A1 | | 1/2005 | Yano et al. | |

FOREIGN PATENT DOCUMENTS

| | | |
|---|---|---|
| CN | 03809869.5 | 8/2005 |
| JP | 57190956 A * | 11/1982 |
| JP | S60-221987 | 4/1984 |
| JP | 2001-500172 | 9/2001 |
| JP | 2005-342559 | 12/2005 |
| JP | 2007-112888 | 5/2007 |
| JP | 2008-050592 | 3/2008 |
| JP | 2010-001370 | 1/2010 |

* cited by examiner

Primary Examiner — William Bell

(57) ABSTRACT

Provided is a process for production of composite fine particles with heterogeneous surfaces. The process ensures a high productivity and enables a voluntary control of particle diameters. Further, the process imposes no restrictions on heterogeneous substances added for functional expression, and allows a heterogeneous substance to be encapsulated in central portions of composite fine particle spheres. A composite film obtained by laminating two or more kinds of films is cut into minute pieces, followed by melting the same to obtain spherical minute pieces. Particularly, liquid films are separately formed with two or more kinds of liquids containing polymerizable monomers. Further, two or more kinds of films can thereby be obtained through polymerization. The two or more kinds of films thus obtained are then laminated to further allow polymerization to take place, thus obtaining the composite film.

11 Claims, 8 Drawing Sheets

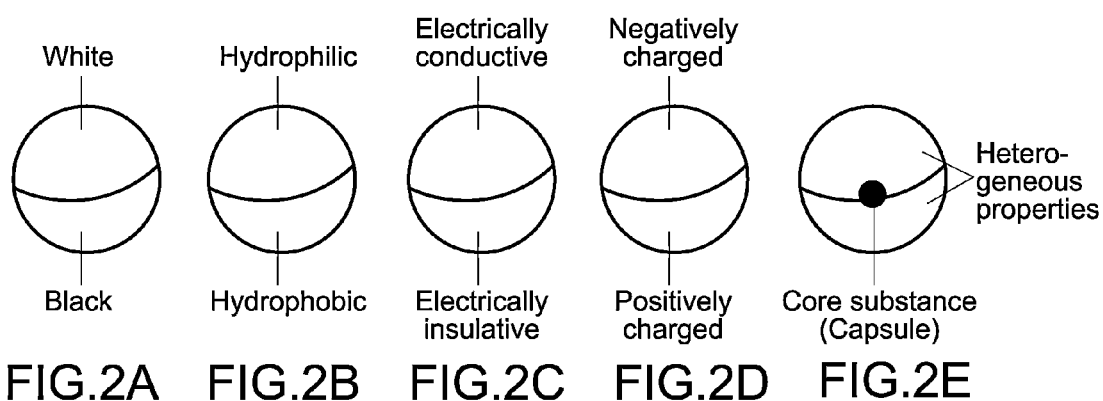
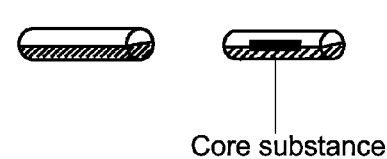

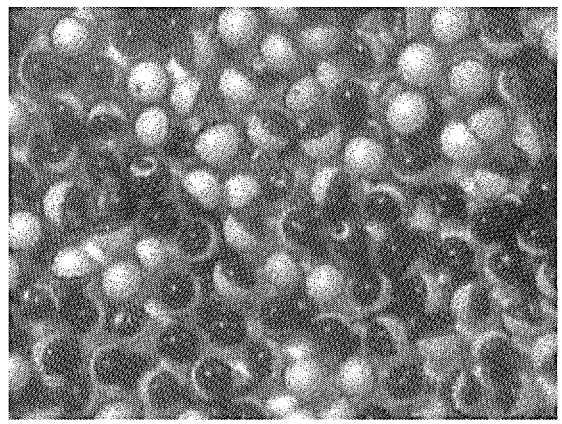
Before voltage is applied
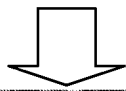
Voltage application
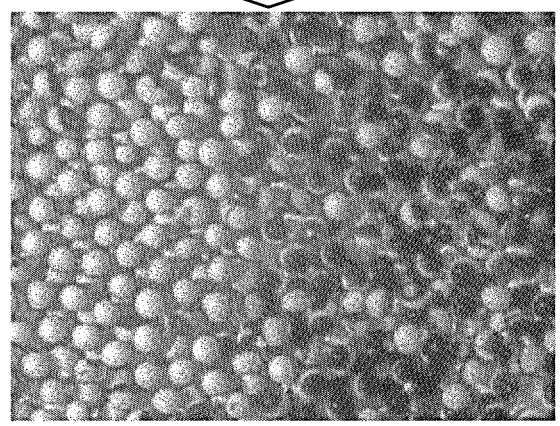
After voltage is applied
FIG.4

100μm
Crushing method

50μm
Laser cutting method

50μm
Cylindrical composite fine particles

Triple-layered composite fine particles  50μm

PROCESS FOR PRODUCTION OF COMPOSITE FINE PARTICLES WITH HETEROGENEOUS SURFACES

TECHNICAL FIELD

The present invention relates to a process for production of composite fine particles with heterogeneous surfaces.

BACKGROUND ART

As spherical particles exhibiting different properties by hemispheres, fine particles individually having a black hemisphere surface and a white hemisphere surface, i.e., black/white bichromal balls, for example, have been used in displays. Further, composite fine particles individually having a hydrophilic hemisphere surface and a hydrophobic hemisphere surface, have been used as surfactant particles for dispersion stabilizers, and may also be used as components of composite fine particles.

As a process for production of such composite fine particles with heterogeneous hemisphere surfaces, there have been known a microreactor method and a nozzle method. These methods either join two kinds of liquid droplets respectively produced from different nozzle ends, or join such two kinds of liquid droplets in a small channel in a microreactor. Problems imposed by the aforementioned methods include: (i) significantly low productivity; (ii) difficulty in realizing a stable operation due to complexities of interface and flow conditions for joining two liquid droplets as one; (iii) limitation in a controllable range of particle diameter due to the fact that the liquid droplet(s) are produced through nozzles or small channels; (iv) restrictions on heterogeneous substances added for functional expression, especially on solid powders due to the fact that the droplet(s) are produced through nozzles or small channels and that a solid powder may thus block the nozzles or small channels; and (v) inability to encapsulate a heterogeneous substance in central portions of composite fine particles.

PRIOR ART DOCUMENTS

Patent Documents

Patent document 1: Japanese Unexamined Patent Application Publication (Translation of PCT Application) No. 2001-500172

DISCLOSURE OF THE INVENTION

Problems to be Solved by the Invention

In view of the aforementioned problems, it is an object of the present invention to provide a process for production of composite fine particles with heterogeneous surfaces, the process: ensuring a high productivity; enabling a voluntary control of particle diameter; imposing no restrictions on heterogeneous substances added for functional expression; and allowing a heterogeneous substance to be encapsulated in central portions of composite fine particle spheres.

Means to Solve the Problems

Various studies were conducted to solve the aforementioned problems. As a result, the present invention could be made based on the following findings. That is, composite fine particles with heterogeneous hemisphere surfaces could be produced by: cutting a composite film obtained by laminating two kinds of films into minute pieces; and then melting the corresponding minute pieces to obtain spherical minute pieces.

That is, the process of the present invention for producing composite fine particles with heterogeneous surfaces, includes: a step of cutting a composite film obtained by laminating two or more kinds of films into minute pieces; and a step of melting the minute pieces.

Further, the composite film is prepared by: forming two or more kinds of liquids, each containing a polymerizable monomer, into two or more kinds of liquid films respectively; subjecting the liquid films to polymerization to form two or more kinds of films; laminating the two or more kinds of films; and subjecting the films thus laminated to further polymerization.

Furthermore, the composite film can be cut into minute pieces of substantially cubical shapes, followed by melting the minute pieces into spherical minute pieces.

Furthermore, the composite film can be cut into minute pieces in the form of substantially quadrangular prisms, followed by melting the minute pieces into cylindrical minute pieces.

Furthermore, the composite film can be cut by a laser cutter.

Furthermore, the composite film can be prepared by laminating: one film obtained by forming a liquid containing a polymerizable monomer and a white pigment into a liquid film and then subjecting the same to polymerization; and another film obtained by forming a liquid containing a polymerizable monomer and a black pigment into a liquid film and then subjecting the same to polymerization, followed by subjecting the films thus laminated to further polymerization.

Furthermore, the composite film can be prepared by laminating: one film obtained by forming a liquid containing a hydrophobic polymerizable monomer into a liquid film and then subjecting the same to polymerization; and another film obtained by forming a liquid containing a hydrophilic polymerizable monomer into a liquid film and then subjecting the same to polymerization, followed by subjecting the films thus laminated to further polymerization.

Furthermore, the composite film can be prepared by laminating: one film obtained by forming a liquid containing a polymerizable monomer and an electrically conductive material into a liquid film and then subjecting the same to polymerization; and another film obtained by forming a liquid containing a polymerizable monomer and an electrically insulative material into a liquid film and then subjecting the same to polymerization, followed by subjecting the films thus laminated to further polymerization.

Furthermore, the composite film can be prepared by laminating: one film obtained by forming a liquid containing a polymerizable monomer and an anionic polymerization initiator into a liquid film and then subjecting the same to polymerization; and another film obtained by forming a liquid containing a polymerizable monomer and a cationic polymerization initiator into a liquid film and then subjecting the same to polymerization, followed by subjecting the films thus laminated to further polymerization.

Furthermore, the composite film can be prepared by: placing core substance particles at a regular interval on one film obtained by forming a liquid containing a polymerizable monomer into a liquid film and then subjecting the same to polymerization; laminating such one film and other film obtained by forming a liquid containing a polymerizable monomer into a liquid film and then subjecting the same to polymerization; and subjecting the films thus laminated to further polymerization.

Furthermore, the core substance particles can be placed on such one film through an ink-jet method.

Furthermore, the composite film can be cut into minute pieces with the core substance particles being located in central portions thereof.

Effects of the Invention

The present invention provides a process for production of composite fine particles with heterogeneous surfaces, the process: ensuring a high productivity; enabling a voluntary control of particle diameter; imposing no restrictions on heterogeneous substances added for functional expression; and allowing a heterogeneous substance to be encapsulated in central portions of composite fine particle spheres.

BRIEF DESCRIPTION OF THE DRAWINGS

FIG. 2 is a pattern diagram showing examples of composite fine particles obtained through the process of the present invention for producing composite fine particles with heterogeneous surfaces.

FIG. 4 is a set of optical micrographs showing composite fine particles obtained in Working example 1.

MODE FOR CARRYING OUT THE INVENTION

Figure 1:
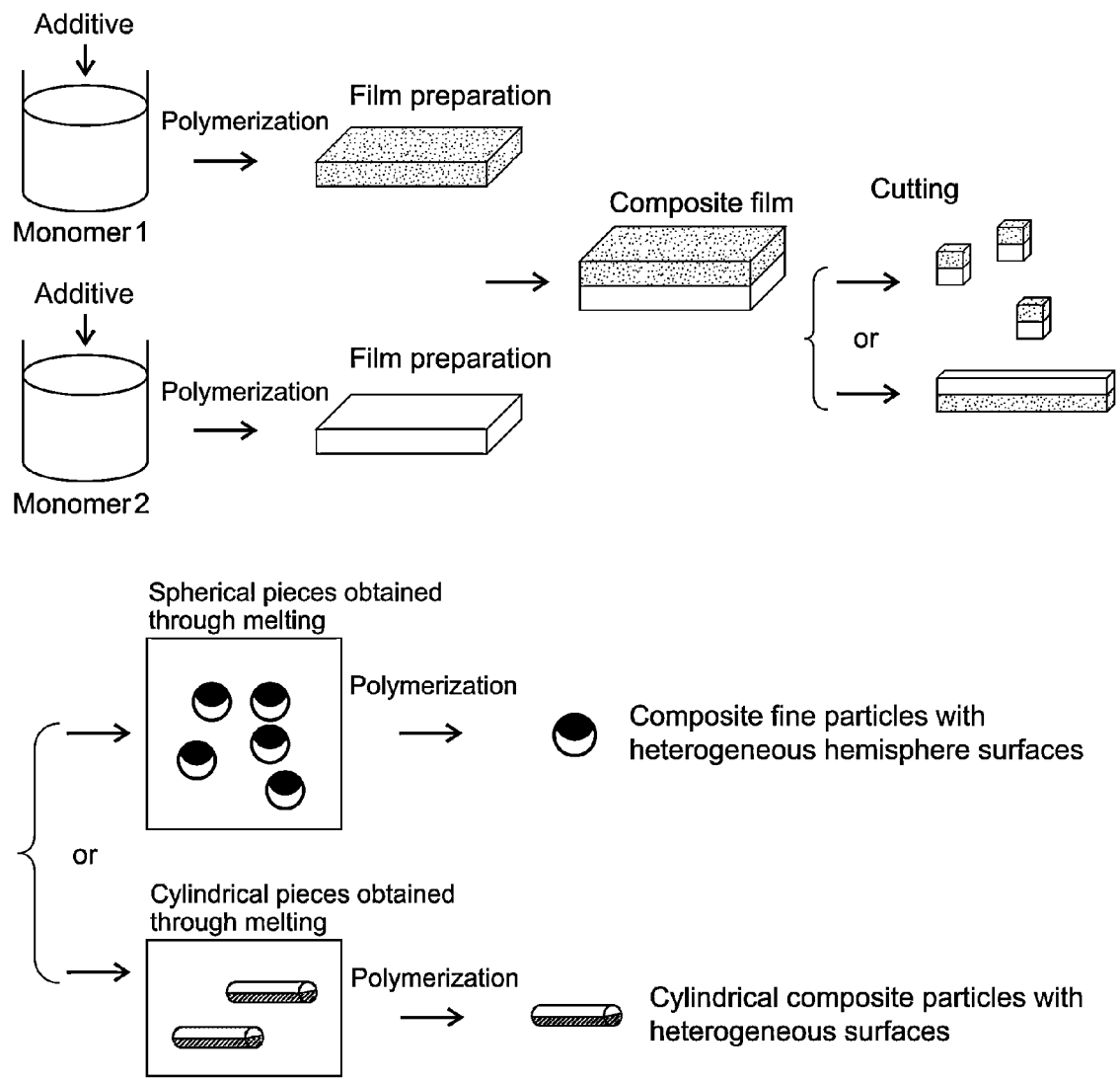
FIG. 1 is a diagram showing a working example of a process of the present invention for producing composite fine particles with heterogeneous surfaces.

There is described hereunder a process for production of composite fine particles with heterogeneous surfaces.

The process for production of composite fine particles with heterogeneous surfaces, includes: preparing a composite film by laminating two or more kinds of films; cutting the composite film thus obtained into minute pieces; and melting the corresponding minute pieces afterwards.

The composite film is obtained as follows. That is, liquid films are separately formed with two or more kinds of liquids containing polymerizable monomers. Further, two or more kinds of films can thereby be obtained through polymerization. The two or more kinds of films thus obtained are then laminated to further allow polymerization to take place, thus obtaining the composite film.

However, the composite film can also be obtained from liquids containing no polymerizable monomer.

Further, the composite film may be cut into minute pieces of substantially cubical shapes, followed by melting the corresponding minute pieces to obtain minute pieces of spherical shapes. Alternatively, the composite film may also be cut into substantially quadrangular prisms serving as minute pieces, followed by melting the corresponding minute pieces to obtain cylindrical minute pieces.

Composite fine particles individually having two kinds of heterogeneous surfaces can be produced, for example, as follows. That is, liquid films are separately formed with two kinds of liquids through casting or the like, the two kinds of liquids being prepared in a manner such that a substance dissolved or dispersed in one of the liquids differs from that of the other liquid in a property such as color, electrification property, electrical conductivity, thermal conductivity, functional group, magnetic property or the like. Later, two kinds of films can be obtained through: polymerization if the liquids contain polymerizable monomers; drying if the liquids are polymer solutions; or gelation if the liquids are solutions containing substances exhibiting an ion-exchange gelation ability and/or a cross-linking function. The two kinds of films thus obtained are then laminated, followed by further allowing polymerization, drying or gelation to take place for a given period of time, thereby causing the two kinds of films to join to each other with a high adhesion while individually maintaining the properties thereof. A composite film thus obtained is then cut into minute pieces in accordance with the intended use, by means of, for example, a laser cutter or a micro cutter that is publically known. Next, the minute pieces of the composite film are added to an incompatible solvent of a temperature not lower than a melting point of the composite film, thereby allowing the corresponding minute pieces to be formed into spherical shapes through melting, thus obtaining spherical composite fine particles individually having different hemisphere surfaces. Here, the spherical minute pieces obtained through melting may be subjected to further polymerization, drying or gelation. In the aforementioned process, there are adjusted: a polymerization time before each film is obtained; and a polymerization time after the composite film is obtained, thereby preventing composite film peeling, thus making it possible to efficiently obtain the composite fine particles with favorable heterogeneous hemisphere surfaces.

FIG. 1 shows a working example of the process of the present invention for producing composite fine particles with heterogeneous surfaces, when using liquids containing polymerizable monomers The process for production of composite fine particles individually having two kinds of heterogeneous hemisphere surfaces, includes: a step of preparing liquids by dissolving or dispersing substances of functional expression in solvents such as polymerizable monomers, water or organic solvents; a step of obtaining two kinds of films through polymerization, drying or gelation of the liquids; a step of laminating these films for further polymerization, drying or gelation; a step of cutting a composite film thus obtained; and a step of forming minute pieces into spherical shapes by melting the same in a solvent, followed by further allowing polymerization, drying or gelation to take place. These steps are significantly simple and can thereby be easily incorporated into a successive process, thus making it possible to massively produce, at a high yield, the target composite fine particles with heterogeneous hemisphere surfaces.

Further, the sizes of the composite fine particles are determined by a thickness of each film and a dimension by which cutting is performed, thus allowing the particle diameters of the composite fine particles to be controlled significantly easily. For example, the particle diameters can be controlled to a range of 5-5000 nm. Particularly, a laser cutter allows cutting to be performed at a high dimensional precision, thus making it possible to obtain monodispersed composite fine particles having a uniform particle diameter. Here, while spherical composite fine particles can be obtained with the composite film cut into pieces of substantially cubical shapes, cylindrical composite fine particles can be obtained with the composite film cut into substantially quadrangular prisms.

Further, the films of different properties are individually prepared and then joined to each other, thus bringing about various functions on each hemisphere surface.

Before joining the two kinds of films to each other, one of the films can be treated as follows. That is, a third component serving as a core substance can be applied on the corresponding film so as to coat the same. Alternatively, particles of the third component can be placed on the corresponding film at a regular interval through a one-shot injection method such as an ink-jet method. In the latter case, the composite film is cut into the minute pieces with the particles of the third component being located in central portions thereof. The minute pieces are then melted such that the third component can be encapsulated in the central portions of the spherical composite fine particles. Here, the one-shot injection method allows an injected amount of the third component to be controlled, thereby making it possible to equalize and voluntarily control the amounts of the third component contained in the composite fine particles. Further, since this method can lead to a 100% efficiency for encapsulating the third component, it is suitable for use in a case in which an expensive third component is employed. Furthermore, by controlling: the thicknesses of the films; the locations at which the third component is placed; and the locations on the composite film where cutting is performed, there can be easily obtained core-shell type microcapsules individually having a concentric core and shell and exhibiting a uniform shell thickness.

Moreover, by forming the two kinds of films to an identical thickness, there can be formed the heterogeneous hemisphere surfaces that are divided by an equator of each spherical particle.

FIG. 2 shows examples of the composite fine particles obtained through the process of the present invention for producing composite fine particles with heterogeneous surfaces.

Here, while the aforementioned working example uses two kinds of liquids, the present invention can be carried out in the same manner even when using three or more kinds of liquids. Further, a method other than casting may be employed to form the liquid films with the liquids.

Figure 3:
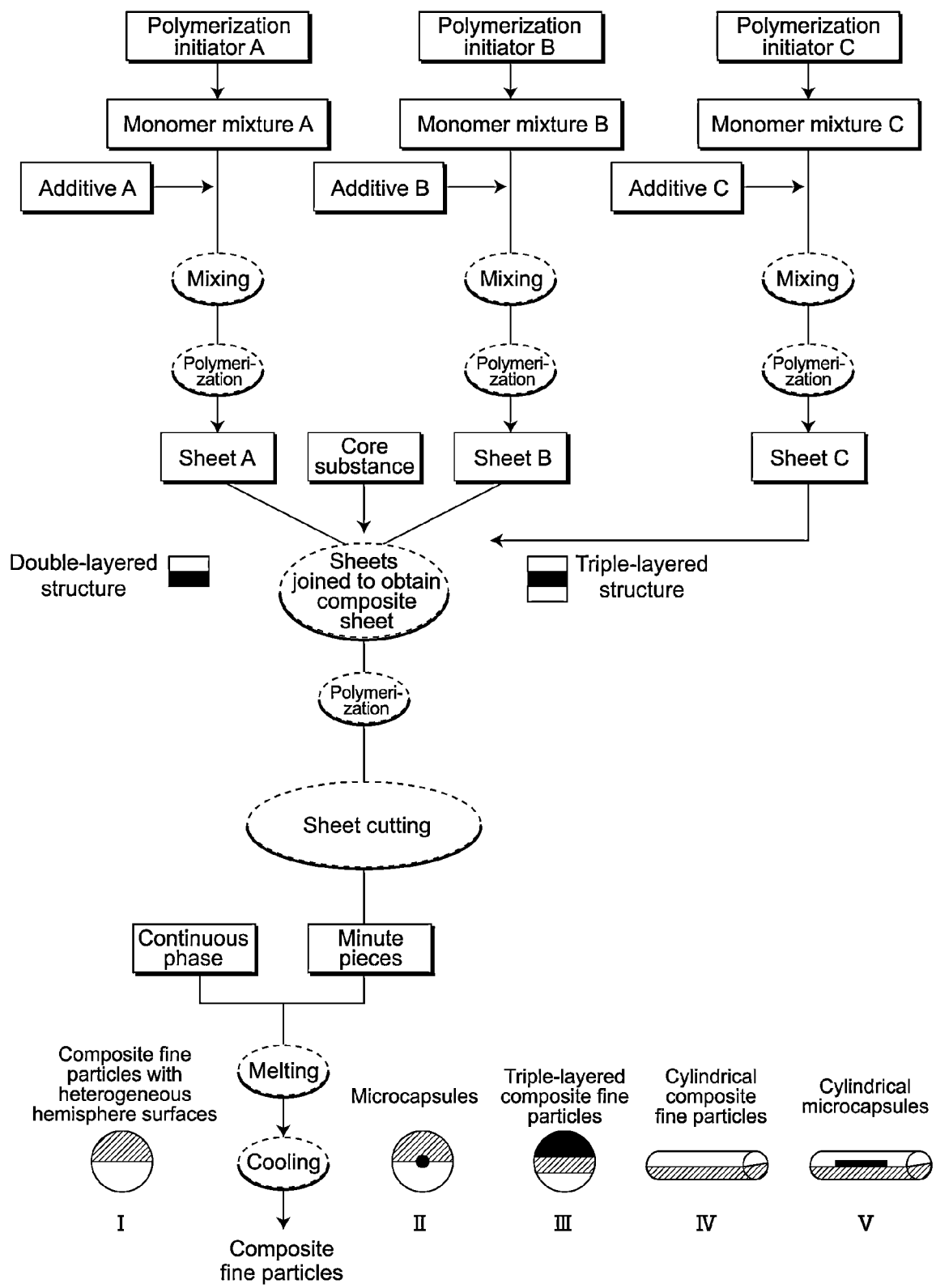
FIG. 3 is a flow chart of Working examples 1 through 6.

With reference to FIG. 3, the process of the present invention for producing composite fine particles with heterogeneous surfaces is described hereunder by taking as an example a case in which polymerizable monomers are used. In FIG. 3, "film(s)" are referred to as "sheet(s)."

Polymerization initiators A, B, C and additives A, B, C are respectively added to and mixed with monomer mixtures A, B, C that contain polymerizable monomers, followed by allowing polymerization to take place for a given period of time. The monomer mixtures A, B, C are then poured into Petri dishes to form sheets through casting and allow a preliminary bulk polymerization to further take place for a given period of time, thereby obtaining sheets A, B, C. Next, the sheets thus obtained are laminated to further allow polymerization to take place for a given period of time, thus obtaining a composite sheet. Here, a double-layered composite sheet can be obtained with two sheets A, B, whereas a triple-layered composite sheet can be obtained with three sheets A, B, C.

A cutting apparatus is then used to cut the composite sheet into minute pieces of a given size (sheet cutting), followed by throwing the minute pieces thus obtained into a continuous phase (e.g., an aqueous phase of 80° C.). The minute pieces are then melted therein before being cooled afterwards. Here, by cutting the double-layered composite sheet into the pieces of substantially cubical shapes, there can be obtained composite fine particles (I) with heterogeneous hemisphere surfaces. Further, by cutting the triple-layered composite sheet into the pieces of substantially cubical shapes, there can be obtained triple-layered composite fine particles (III). Furthermore, by cutting the double-layered composite sheet into substantially quadrangular prisms, there can be obtained cylindrical composite fine particles (IV). Moreover, by placing the core substance on one of the sheets A, B before laming the two, there can be obtained microcapsules (II) with heterogeneous hemisphere surfaces and cylindrical microcapsules (V) with heterogeneous surfaces.

The process of the present invention for producing composite fine particles with heterogeneous surfaces, can be used to produce composite fine particles that are useful in fields such as information recording material (electrically conductive-electrically insulative, black-white, negatively charged-positively charged), stationery product (black-white), medicinal product (negatively charged-positively charged, hydrophilic-hydrophobic) and adhesive agent/paint (magnetic-nonmagnetic, electrically conductive-electrically insulative, thermally conductive-thermally nonconductive). Further, the encapsulation of various kinds of core substances allows the composite fine particles to be used in fields such as agriculture, cosmetic product, civil engineering/construction and food product. Particularly, through the process of the present invention for producing composite fine particles with heterogeneous surfaces, there can be obtained composite fine particles with a uniform quality and a high added value.

Specific working examples are described hereunder.

Working Example 1

Production of Black-and-White Fine Particles

Composite fine particles were produced in accordance with a flow shown in FIG. 3. Particularly, as each of monomer mixtures A, B, there was used a 5 g mixture of styrene monomer and ethylhexyl acrylate. As each of polymerization initiators A, B, there was used 0.5 g of AIBN (azobisisobutyronitrile). As an additive A, there was used 0.5 g of a titanium dioxide ($TiO_2$) powder serving as a white pigment. As an additive B, there was used 0.5 g of a magnetite ($Fe_3O_4$) powder serving as a black pigment. As a surfactant added to each of the monomer mixtures A, B, there was used 0.05 g of Span 80 (sorbitan monooleate).

The polymerization initiator A, the additive A and the surfactant were added to and mixed with the monomer mixture A to allow a preliminary bulk polymerization to take place for a given period of time. Later, a blended monomer thus obtained was poured into a Petri dish to form a film through casting and continuously allow the preliminary bulk polymerization to take place, thereby obtaining a sheet A. Likewise, the polymerization initiator B, the additive B and the surfactant were added to and mixed with the monomer mixture B to allow the preliminary bulk polymerization to take place for a given period of time. Later, a blended monomer thus obtained was poured into a Petri dish to form a film through casting and continuously allow the preliminary bulk polymerization to take place, thereby obtaining a sheet B.

After polymerization was over, the sheet A and the sheet B that were films of two kinds were then laminated to allow polymerization to take place for 30-60 minutes. A composite film thus obtained was further cut into pieces of 20-30 μm square through a laser cutter, followed by throwing the pieces into a continuous phase of 80° C. to melt the same, thereby obtaining pieces of spherical shapes. Here, as the continuous phase, there was employed 100 g of ethylene glycol with 0.5 g of polyvinyl alcohol and 2.5 g of tricalcium phosphate dissolved therein.

After the remaining monomers had been consumed through further polymerization, the pieces of spherical shapes were then cooled, thus obtaining bichromal composite fine particles shown in FIG. 2(a), each particle having a black hemisphere and a white hemisphere.

FIG. 4 is a set of optical micrographs of the composite fine particles thus obtained. It was confirmed that the directions of the particles in an insulation oil had been organized after applying a voltage thereto. That is, the composite fine particles thus obtained can be arranged in a controlled manner through voltage application, and can thereby be used as balls for twisting ball displays.

Figure 5A:
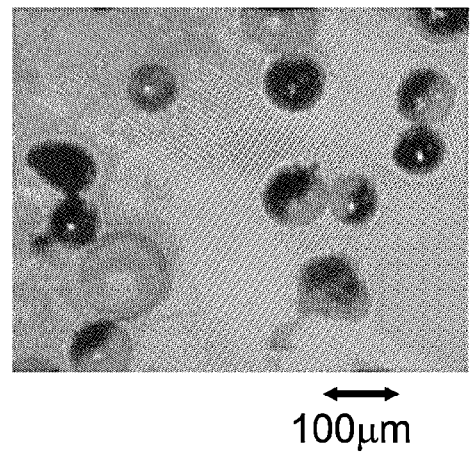
FIG. 5 is a set of optical micrographs including: an optical micrograph showing the composite fine particles obtained in Working example 1; and an optical micrograph showing composite fine particles obtained with a crushed composite film.
Figure 5B:
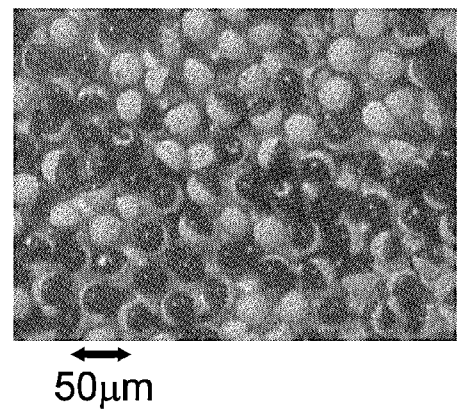

Composite fine particles shown in FIG. 5(a) were obtained using a method similar to that of the present working example except for the fact that the composite film was not cut through a laser cutter, but crushed. While the composite fine particles shown in FIG. 5(a) had various particle diameters, the composite fine particles (FIG. 5(b)) of the present working example had a uniform particle diameter.

[Production of Black-and-White Fine Particles 2]

Composite fine particles were produced using a method similar to the aforementioned method except for the fact that a mixture of 5 g of styrene monomer and 2 g of butyl acrylate was used as each of the monomer mixtures A, B.

As a result, there were obtained the bichromal composite fine particles shown in FIG. 2(a), each particle having the black hemisphere and the white hemisphere.

Figure 6:
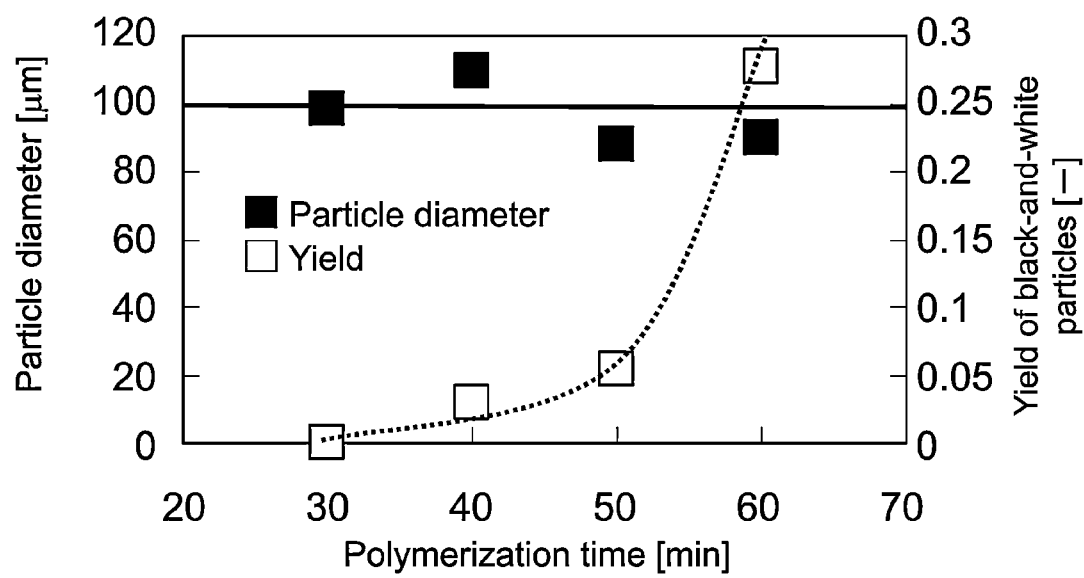
FIG. 6 is a graph showing a correlation between polymerization times of monomer mixtures A, B and a yield of bichromal composite fine particles, in Working example 1.

As for a correlation between polymerization times of the monomer mixtures A, B and a yield of the bichromal composite fine particles (black-and-white particles), it was found, as shown in FIG. 6, that a polymerization time of longer than 60 minutes (rate of polymerization 58%) led to a high yield.

[Production of Black-and-White Fine Particles 3]

Composite fine particles were produced using a method similar to the aforementioned method except for the fact that the composite film was cut into quadrangular prisms.

As a result, there were obtained cylindrical composite fine particles.

Figure 7:
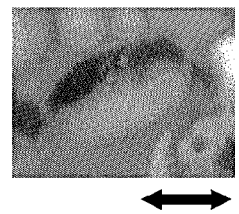
FIG. 7 is an optical micrograph showing cylindrical composite fine particles obtained in Working example 1.

The micrographs of the composite fine particles thus obtained are shown in FIG. 7.

Working Example 2

Production of Hydrophilic/Hydrophobic Fine Particles

As is the case in Working example 1, composite fine particles were produced in accordance with the flow shown in FIG. 3. Particularly, as a hydrophobic monomer mixture A, there was used a 5 g mixture of styrene monomer and ethylhexyl acrylate. As a monomer mixture B containing a methacrylic acid serving as a hydrophilic monomer, there was used a 5 g mixture of styrene monomer, ethylhexyl acrylate and a methacrylic acid. As each of polymerization initiators A, B, there was used 0.5 g of AIBN (azobisisobutyronitrile). As a surfactant added to each of the monomer mixtures A, B, there was used 0.05 g of Span 80 (sorbitan monooleate).

As a result, there were obtained composite fine particles shown in FIG. 2(b), each particle having a hydrophobic hemisphere and a hydrophilic hemisphere.

[Production of Hydrophilic/Hydrophobic Fine Particles 2]

Composite fine particles were produced using a method similar to the aforementioned method expect for the fact that the hydrophobic monomer mixture A was a mixture of 5 g of styrene monomer and 2 g of butyl acrylate, and that the hydrophilic monomer mixture B was a mixture of 5 g of styrene monomer, 2 g of butyl acrylate and 1 g of a methacrylic acid.

As a result, there were obtained the composite fine particles shown in FIG. 2(b), each particle having the hydrophobic hemisphere and the hydrophilic hemisphere.

Further, the composite fine particles thus obtained were added to an O/W disperse system composed of styrene monomer (O) and water (W) to form a Pickering emulsion system. Here, it was found that the composite fine particles had stabilized the emulsion system by adhering to oil drop surfaces.

Working Example 3

Production of Electrically Conductive/Insulative Fine Particles

As is the case in Working example 1, composite fine particles were produced in accordance with the flow shown in FIG. 3. Particularly, as each of monomer mixtures A, B, there was used a 5 g mixture of styrene monomer and ethylhexyl acrylate. As each of polymerization initiators A, B, there was used 0.5 g of AIBN (azobisisobutyronitrile). As an additive A, there was used 0.5 g of a magnetite ($Fe_3O_4$) powder that was electrically conductive. As an additive B, there was used 0.5 g of a silicon dioxide ($SiO_2$) powder that was electrically insulative. As a surfactant added to each of the monomer mixtures A, B, there was used 0.05 g of Span 80 (sorbitan monooleate).

As a result, there were obtained composite fine particles shown in FIG. 2(c), each particle having an electrically conducive hemisphere and an electrically insulative hemisphere.

[Production of Electrically Conductive/Insulative Fine Particles 2]

Composite fine particles were produced using a method similar to the aforementioned method except for the fact that a mixture of 5 g of styrene monomer and 2 g of butyl acrylate was used as each of the monomer mixtures A, B, and that no additive B was added.

As a result, there were obtained the composite fine particles shown in FIG. 2(c), each particle having the electrically conducive hemisphere and the electrically insulative hemisphere.

Figure 8:
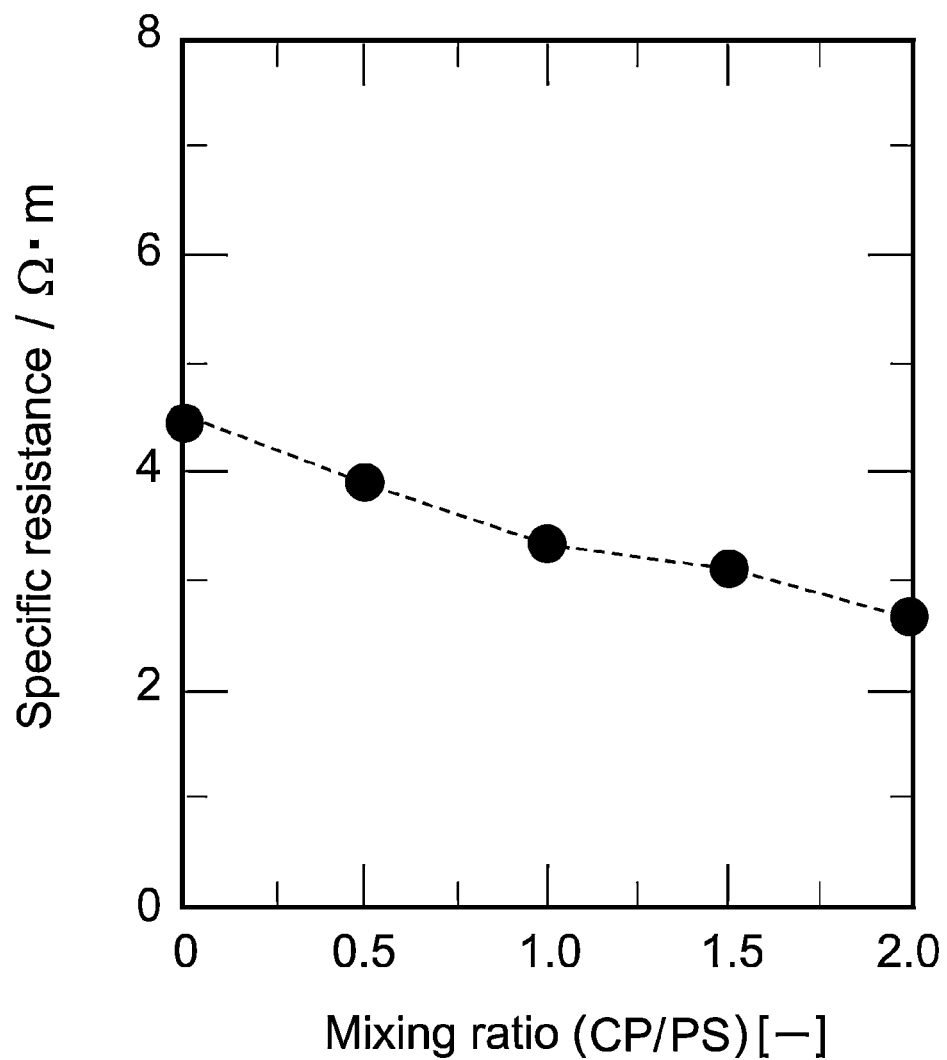
FIG. 8 is a graph showing a correlation between a mixing ratio of composite fine particles and a specific resistance thereof, in Working example 3.

Further, a specific resistance measurement device was used to measure a specific resistance while changing a mixing ratio between such composite fine particles (CP) and insulative polystyrene particles (PS). As shown in FIG. 8, it was found that the specific resistance had decreased as an additive amount of the composite fine particles was increased.

Working Example 4

Production of Positively/Negatively-Charged Fine Particles

As is the case in Working example 1, composite fine particles were produced in accordance with the flow shown in FIG. 3. Particularly, as each of monomer mixtures A, B, there was used a 5 g mixture of styrene monomer and ethylhexyl acrylate. As a polymerization initiator A, there was used 0.5 g of AIBN (azobisisobutyronitrile) servings as an anionic polymerization initiator. As a polymerization initiator B, there was used AIBA (azobisisobutylamidine hydrochloride) serving as a cationic polymerization initiator. As a surfactant added to each of the monomer mixtures A, B, there was used 0.05 g of Span 80 (sorbitan monooleate).

As a result, there were obtained composite fine particles shown in FIG. 2(d), each particle having a positively-charged hemisphere and a negatively-charged hemisphere.

[Production of Positively/Negatively-Charged Fine Particles 2]

Composite fine particles were produced using a method similar to the aforementioned method except for the fact that a mixture of 5 g of styrene monomer and 2 g of butyl acrylate was used as each of the monomer mixtures A, B.

As a result, there were obtained the composite fine particles shown in FIG. 2(d), each particle having the positively-charged hemisphere and the negatively-charged hemisphere.

Working Example 5

Production of Triple-Layered Fine Particles

As is the case in Working example 1, composite fine particles were produced in accordance with the flow shown in FIG. 3. Particularly, as each of monomer mixtures A, B, C, there was used a 5 g mixture of styrene monomer and ethylhexyl acrylate. As each of polymerization initiators A, B, C, there was used 0.5 g of AIBN (azobisisobutyronitrile). As each of additives A, C, there was used 0.5 g of a magnetite ($Fe_3O_4$) powder that was electrically conductive. As an additive B, there was used 0.5 g of a silicon dioxide ($SiO_2$) powder that was electrically insulative. As a surfactant added to each of the monomer mixtures A, B, there was used 0.05 g of Span 80 (sorbitan monooleate).

As a result, there were obtained triple-layered composite fine particles.

[Production of Triple-Layered Fine Particles 2]

Composite fine particles were produced using a method similar to the aforementioned method except for the fact that a mixture of 5 g of styrene monomer and 2 g of butyl acrylate was used as each of the monomer mixtures A, B, C, and that no additive B was added.

As a result, there were obtained the triple-layered composite fine particles.

Figure 9:
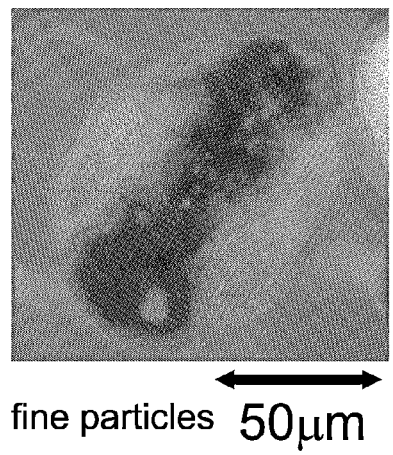
FIG. 9 is an optical micrograph showing a triple-layered fine particle obtained in Working example 5.

The micrographs of the composite fine particles thus obtained are shown in FIG. 9.

Working Example 6

Production of Microcapsule-Type Fine Particles

Figure 10:
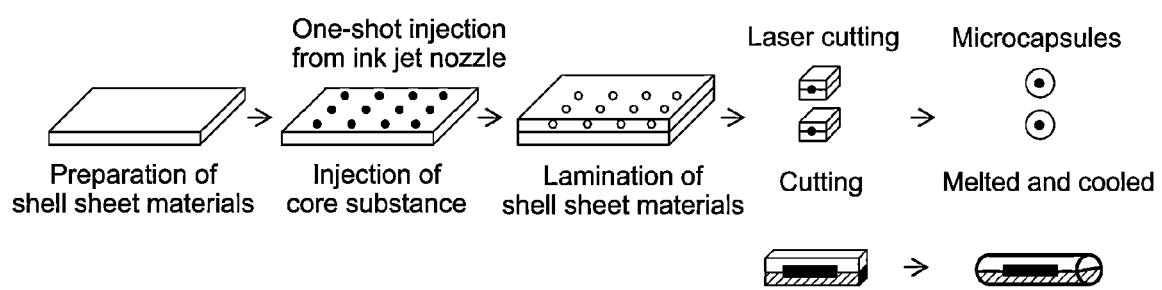
FIG. 10 is a diagram showing a production process in Working example 6.

Composite fine particles were produced in accordance with FIG. 10 and the flow shown in FIG. 3. Particularly, as each of monomer mixtures A, B, there was used a 5 g mixture of styrene monomer and ethylhexyl acrylate. As each of polymerization initiators A, B, there was used 0.5 g of AIBN (azobisisobutyronitrile). As a core substance, there were used silver particles. As a surfactant added to each of the monomer mixtures A, B, there was used 0.05 g of Span 80 (sorbitan monooleate).

A sheet A and a sheet B were prepared through procedures similar to those in Working example 1. The silver particles were then placed on the sheet A at a regular interval of 20-30 nm, the regular interval being an interval at which cutting is performed through a cutting apparatus. Next, the sheet A and the sheet B that were films of two kinds were laminated to allow polymerization to take place for 30-60 minutes. A composite film thus obtained was further cut into pieces of 20-30 nm square through the cutting apparatus, followed by throwing the pieces into a continuous phase of 80° C. to melt the same, thereby obtaining pieces of spherical shapes. Here, as the continuous phase, there was employed 100 g of ethylene glycol with 0.5 g of polyvinyl alcohol and 2.5 g of tricalcium phosphate dissolved therein.

After the remaining monomers had been consumed through further polymerization, the pieces of spherical shapes were then cooled, thus obtaining microcapsule-type composite fine particles with the sliver particles being encapsulated in central portions thereof, the silver particles serving as the core substance.

[[Production of Microcapsule-Type Fine Particles 2]

Composite fine particles were produced using a method similar to the aforementioned method except for the fact that a mixture of 5 g of styrene monomer and 2 g of butyl acrylate was used as each of the monomer mixtures A, B, and that a water solution of L-ascorbic acid of 2% by mass was used as the core substance. Particularly, the water solution of L-ascorbic acid was discharged onto the sheet A from an ink-jet nozzle, followed by evaporating the water before laminating the sheet A and the sheet B.

As a result, there were obtained microcapsule-type composite fine particles with L-ascorbic acid being encapsulated in central portions thereof, the L-ascorbic acid serving as the core substance.

Figure 11:
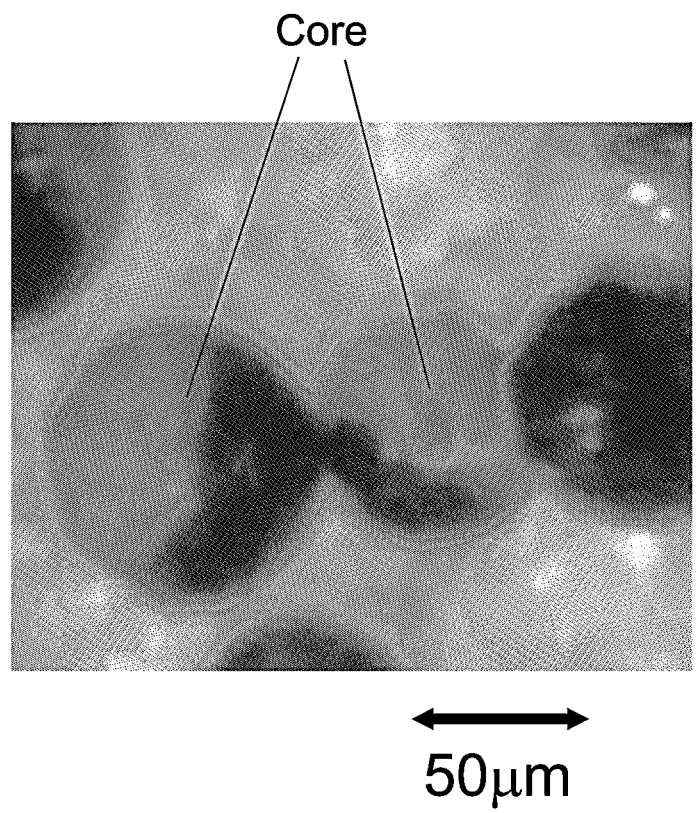
FIG. 11 is an optical micrograph showing microcapsule-type composite fine particles obtained in Working example 6.

The micrographs of the composite fine particles thus obtained are shown in FIG. 11.

Working Example 7

Unlike the aforementioned working examples, polymer solutions can also be used to prepare the two kinds of films. Particularly, the films can be prepared by removing solvents after liquid films have been formed. For example, polystyrene can be used as a polymer, and limonene and dichloromethane can be used as solvents. Further, when a hydrophilic monomer(s) are used to form the two kinds of films, there can be obtained hydrophilic composite fine particles with various hemisphere surfaces. Furthermore, when a water-soluble polysaccharide(s) gelating through a gelator are used, there can be obtained composite fine particles having heterogeneous hemisphere surfaces whose matrices are composed of polysaccharide(s).

The invention claimed is:

1. A process for production of composite fine particles with heterogeneous surfaces, comprising:
    forming two or more kinds of liquids, each containing a polymerizable monomer, into two or more kinds of liquid films respectively;
    subjecting said liquid films to polymerization to form two or more kinds of films;
    laminating said two or more kinds of films to form a composite film;
    subjecting the composite film to further polymerization;
    a step of cutting the composite film into minute pieces; and
    a step of melting said minute pieces.

2. The process for production of composite fine particles with heterogeneous surfaces according to claim 1, wherein said composite film is cut into minute pieces of substantially cubical shapes, followed by melting said minute pieces into spherical minute pieces.

3. The process for production of composite fine particles with heterogeneous surfaces according to claim 1, wherein said composite film is cut into minute pieces in the form of substantially quadrangular prisms, followed by melting said minute pieces into cylindrical minute pieces.

4. The process for production of composite fine particles with heterogeneous surfaces according to claim 1, wherein said composite film is cut by a laser cutter.

5. The process for production of composite fine particles with heterogeneous surfaces according to claim 1, wherein said composite film is prepared by laminating:
   one film obtained by forming a liquid containing a polymerizable monomer and an electrically conductive material into a liquid film and then subjecting the same to polymerization; and
   another film obtained by forming a liquid containing a polymerizable monomer and an electrically insulative material into a liquid film and then subjecting the same to polymerization, followed by subjecting the films thus laminated to further polymerization.

6. The process for production of composite fine particles with heterogeneous surfaces according to claim 1, wherein said composite film is prepared by laminating:
   one film obtained by forming a liquid containing a polymerizable monomer and an anionic polymerization initiator into a liquid film and then subjecting the same to polymerization; and
   another film obtained by forming a liquid containing a polymerizable monomer and a cationic polymerization initiator into a liquid film and then subjecting the same to polymerization, followed by subjecting the films thus laminated to further polymerization.

7. The process for production of composite fine particles with heterogeneous surfaces according to claim 1, wherein said composite film is prepared by:
   placing core substance particles at a regular interval on one film obtained by forming a liquid containing a polymerizable monomer into a liquid film and then subjecting the same to polymerization;
   laminating said one film and other film obtained by forming a liquid containing a polymerizable monomer into a liquid film and then subjecting the same to polymerization; and
   subjecting the films thus laminated to further polymerization.

8. The process for production of composite fine particles with heterogeneous surfaces according to claim 7, wherein said core substance particles are placed on said one film through an ink-jet method.

9. The process for production of composite fine particles with heterogeneous surfaces according to claim 7, wherein said composite film is cut into minute pieces with said core substance particles being located in central portions thereof.

10. A process for production of composite fine particles with heterogeneous surfaces comprising:
   forming a liquid containing a polymerizable monomer and a white pigment into a liquid film and then subjecting the same to polymerization to obtain a first film;
   forming a liquid containing a polymerizable monomer and a black pigment into a liquid film and then subjecting the same to polymerization to obtain a second film;
   laminating the films to prepare a composite film;
   subjecting the composite film to further polymerization;
   a step of cutting the composite film into minute pieces; and
   a step of melting said minute pieces.

11. A process for production of composite fine particles with heterogeneous surfaces comprising:
   forming a liquid containing a hydrophobic polymerizable monomer into a liquid film and then subjecting the same to polymerization to form a first film;
   forming a liquid containing a hydrophilic polymerizable monomer into a liquid film and then subjecting the same to form a second film;
   laminating the films to prepare a composite film;
   subjecting the composite film to further polymerization;
   a step of cutting the composite film into minute pieces; and
   a step of melting said minute pieces.

* * * * *